(12) United States Patent
Cen

(10) Patent No.: US 7,471,675 B2
(45) Date of Patent: Dec. 30, 2008

(54) ARRANGEMENTS FACILITATING ORDERED TRANSACTIONS

(75) Inventor: Ling Cen, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 1621 days.

(21) Appl. No.: 10/193,290

(22) Filed: Jul. 12, 2002

(65) Prior Publication Data

US 2004/0008677 A1    Jan. 15, 2004

(51) Int. Cl.
*H04L 12/50* (2006.01)
*H04J 1/00* (2006.01)
*G06F 12/00* (2006.01)

(52) U.S. Cl. .................. 370/382; 370/489; 711/118
(58) Field of Classification Search .................. None
See application file for complete search history.

(56) References Cited

U.S. PATENT DOCUMENTS 6,393,536 B1 * 5/2002 Hughes et al. .............. 711/159
6,473,837 B1 * 10/2002 Hughes et al. .............. 711/146
6,662,280 B1 * 12/2003 Hughes ...................... 711/156

* cited by examiner

*Primary Examiner*—Melanie Jagannathan
(74) *Attorney, Agent, or Firm*—Robert D. Anderson

(57) ABSTRACT

Arrangements facilitating ordered transactions, e.g., ordered writes, in a packet switch system having multiple switch elements.

33 Claims, 5 Drawing Sheets

ARRANGEMENTS FACILITATING ORDERED TRANSACTIONS

FIELD

The present invention is directed to arrangements facilitating ordered transactions, e.g., ordered writes, in a local machine packet switch system having multiple switch elements.

BACKGROUND

As the bandwidth demand increases for modern computer systems, the traditional shared bus architecture becomes increasingly difficult to scale. High performance systems are moving towards a packet oriented point-to-point inter-connection.

In one background packet switching system, most of the coherent transactions may be finished out-of-order and strongly ordered writes issued and retired one at a time. However, one at a time sequential processing within such system limits performance thereof. To enhance the streaming performance of strongly ordered writes, another background approach would be to resort to tracking every strongly ordered write in the system fabric using multiple messages between each switch element or fork to retire the writes in the proper order. While this approach does allow out-of-order executing of strongly ordered write streams, it adds considerable message overhead and complexity due to potential retries of ordered writes.

Coherent nodes with coherent ordered write streams can issued out-of-order read-for-ownership (RFO) transactions and thus achieve high streaming performance, but the streaming depth is limited to the buffer size at the node and the buffers in the system fabric are not efficiently utilized. Due to a quirk of the Microsoft OS implementation, even uncacheable (UC) transactions like UC writes and USWC writes have to be treated as coherent writes due to cache attribute aliasing. Thus all writes to memory mapped devices are effectively strongly ordered coherent writes.

A typical PC system cannot afford the cost of a fully coherent IO node (south bridge). The south bridge in a PC is best described as semi-coherent. While a south bridge can issue streams of coherent reads with no coherent buffers or caches, writes from the south bridge are from PCI bus/bridges and strongly ordered. If those strongly ordered writes are transferred one at a time, the system performance will be extremely poor.

Attention is directed to U.S. Pat. No. 6,356,983 B1 issued to Parks on 12 Mar. 2002, a background section of which provides good discussion concerning some background caching and coherency approaches.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and that the invention is not limited thereto. The spirit and scope of the present invention are limited only by the terms of the appended claims.

The following represents brief descriptions of the drawings, wherein.

DETAILED DESCRIPTION

Figure 1:
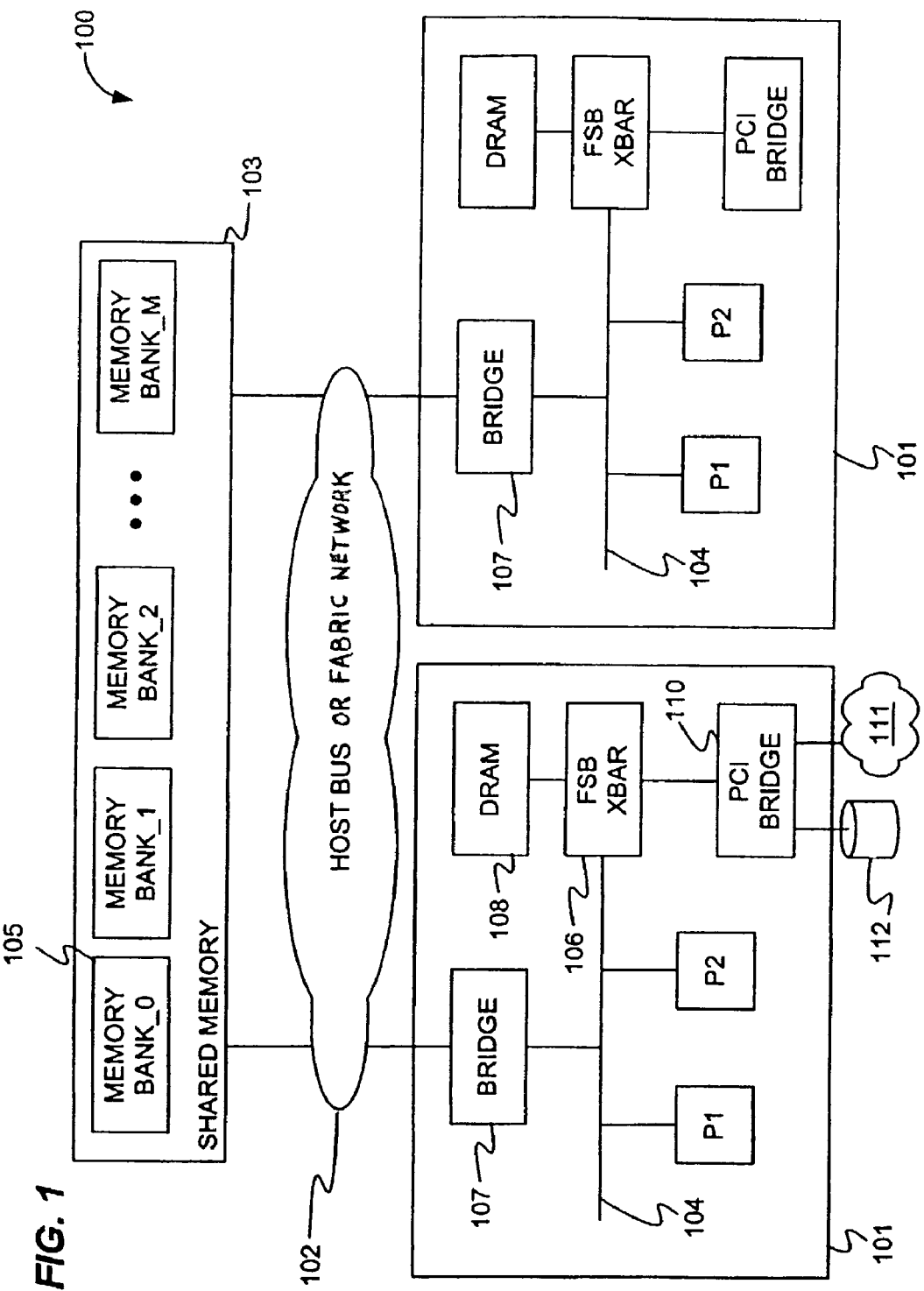
FIG. 1 shows an example multiprocessor (local machine) computer environment in which an embodiment of the present invention may be implemented.

Before beginning a detailed description of the subject invention, mention of the following is in order. When appropriate, like reference numerals and characters may be used to designate identical, corresponding or similar components in differing figure drawings. Further, in the detailed description to follow, example sizes/models/values/ranges may be given, although the present invention is not limited to the same. Well known power/ground/signaling connections to ICs and other components may not be shown within the FIGS. for simplicity of illustration and discussion, and so as not to obscure the invention. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. Where specific details (e.g., circuits, flow diagrams, state diagrams) are set forth in order to describe example embodiments of the invention, it should be apparent to one skilled in the art that the invention can be practiced without, or with variation of, these specific details. Finally, it should be apparent that differing combinations of hard-wired circuitry and software instructions can be used to implement embodiments of the present invention, i.e., the present invention is not limited to any specific combination of hardware and software.

Although example embodiments of the present invention will be described using an example system block diagram in an example personal computer (PC) environment, practice of the invention is not limited thereto, i.e., the invention may be able to be practiced within other types of local electronic devices (e.g., servers) and/or systems (mainframes).

As an introduction, the following disclosure describes new streaming arrangements (e.g., apparatus and method) for streaming transactions. As one example, strongly ordered coherent writes are implemented as snooped writes of strong order (SNPW_SO). That is, a SNPW_SO can be issued without allocating any coherent buffers at a node. The local machine's system fabric (including the nodes, the switches and their interconnections) will guarantee the coherency of the machine.

Turning now to a more detailed description, an example embodiment of the present invention is illustrated and described in terms of a general-purpose multiprocessing computing system comprising a number of substantially identical microprocessors having integrated cache memory. Although this type of computing system is a good tool for illustrating the features and principles of the present invention, it should be understood that a heterogeneous set of processors may be used. Some processors may include integrated cache, some processors may include external cache, and yet other processors may have no cache at all. The invention is illustrated in terms of a shared memory system, but certain aspects will have application in partitioned memory systems as well. Accordingly, the specific examples given herein are supplied for purposes of illustration and understanding and are not to be viewed as limitations of the invention except where expressly stated. Moreover, an important feature of the present invention is that it is readily scaled upwardly and downwardly to meet the needs of a particular application or processor count. Accordingly, unless specified to the contrary, the present invention may be applicable to significantly larger, more complex network environments as well as small network environments such as conventional local area network (LAN) systems.

FIG. 1 shows an example multiprocessor computer environment in which an embodiment of the present invention may be implemented. Multiprocessor computer system 100 incorporates N processor boards 101. Each processor board 101 may include one or more microprocessors, such as processors P1 and P2, having integrated cache memory in this particular example. Processor boards 101 may be configured in groups sharing a common front side bus 104 and sharing a common gateway through a bridge 107 to host bus or fabric network 102. An exemplary processor is any Pentium™ family processor manufactured by Intel Corporation, and such may be configured as single processors or in clusters, e.g., eight processors.

Processor boards 101 are bi-directionally coupled to shared memory 103 through host bus or fabric network 102. Host bus or fabric network 102 preferably implements a full crossbar or fabric connection enabling any processor board 101 to access any memory location implemented in any memory bank 105. Shared memory 103 is configured as a plurality M of memory banks 105. Each memory bank 105 may itself comprise a group of memory components. Shared memory 103 may be organized as a plurality of "lines", where each line is sized based on the architecturally defined line size of cache within processor boards 101. A line in memory or cache may, for example, be designated as a smallest accessible unit of data, although the present invention may also support memory architectures that permit addressing within a line.

Each processor board 101 may include a front side bus crossbar 106 or a fabric that enables access to local memory 108 and peripheral component interconnect (PCI) bridge 110. In the particular FIG. 1 example, local memory 108 may not be included in the address space of shared memory 103 and may be shared only amongst processors P1 and P2 coupled to the same front side bus 104 as the FSB crossbar 106. PCI bridge 110 supports conventional PCI devices to access and manage, for example, connections to external network 111 and/or storage 112. It is contemplated that some processor boards 101 may eliminate the PCI bridge functionality where PCI devices are available through other boards 101.

The following discussion turns first to general operations within the FIG. 1 system, and later discussion will turn to the new streaming operations. More particularly, memory operations are conducted when a (source) processor P1 or P2 executes an instruction that requires a load from, or store to, a target (home) location in memory 103. Input/output devices and peripherals may also access memory, but for ease of description the examples herein refer only to memory operations conducted by processors. In executing a memory operation, the processor (acting as a source node) first determines whether the target memory location is represented, valid and accessible in a cache.

The cache may be onboard the processor executing the memory operation or may be in an external cache memory. In case of a cache miss, the memory operation is handled by bridge 107 (e.g., acting as a switch). Bridge 107 generates an access request to host bus or fabric network 102 specifying the target location address (home node), operation type (e.g., read/write), as well as any other control information that may be required in a particular implementation. The particulars/formatting of this request (and any other request discussed in this disclosure) are highly dependent upon the particulars of a platform upon which an embodiment of the present invention is implemented, and such request particulars/formatting should be well within a purview of those skilled in the art.

Shared memory 103 receives the request and accesses the specified memory location. In the case of a read operation the requested data is returned via a response passed through host bus or fabric network 102, and addressed to the bridge 107 that generated the access request. A write transaction may return an acknowledgement that the write occurred. In the event an error occurs within shared memory 103, the response to bridge 107 may include a condition code indicating information about the error.

Figure 2:
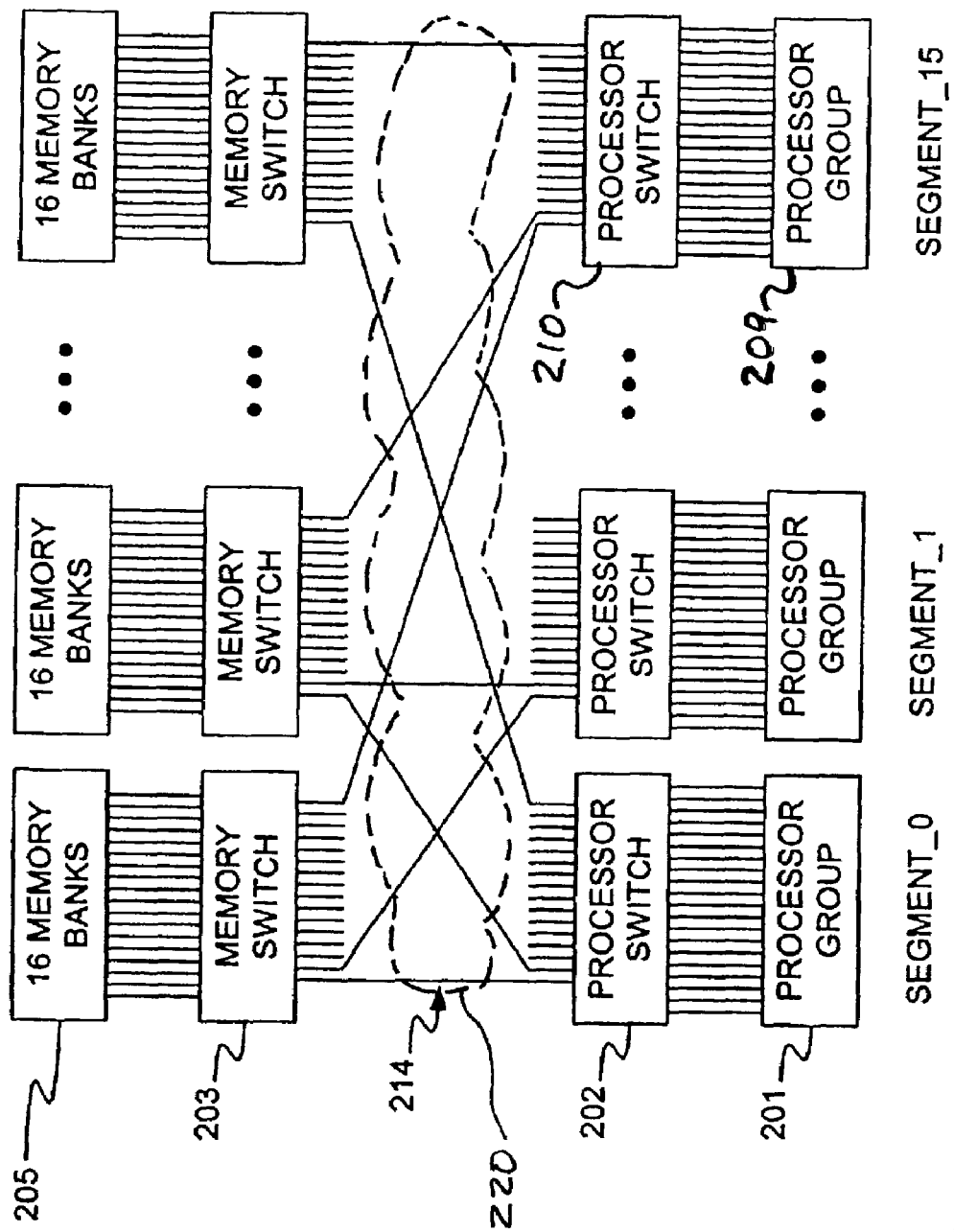
FIG. 2 shows an example switch node representation of a portion of the FIG. 1 multiprocessor computer environment.

FIG. 2 shows an example switch node representation of a portion of the FIG. 1 multiprocessor computer environment. More particularly, FIG. 2 illustrates a specific example implementation and interconnect strategy. In the implementation of FIG. 2, there is an example of sixteen segments (nodes) labeled SEGMENT_0 through SEGMENT_15. Each segment includes a processor group (201, 209 shown as examples). A processor group in a particular example, may each include sixteen pairs of processors (e.g., sixteen processor boards 101), each coupled to a respective processor switch 202, 210 through a bi-directional data and command bus/switch interface coordinating with or as bridge 107. Processor switch 202, 210 may include an output to a trunk line 214 for each memory bank group 205 or to a fabric 220. Similarly, each memory switch 203 may include an output to the trunk line 214 for each processor group 201, or to the fabric 220. In this manner, any processor group may be selectively coupled to any memory bank group (node) through appropriate configuration of processor switch 202, 210 and memory switch 203, and any trunk line or fabric path. There is no requirement that a number of processor groups 201, 209 and a number of memory banks 205 match each other, i.e., either can be scaled to any desired degree.

Figure 3:
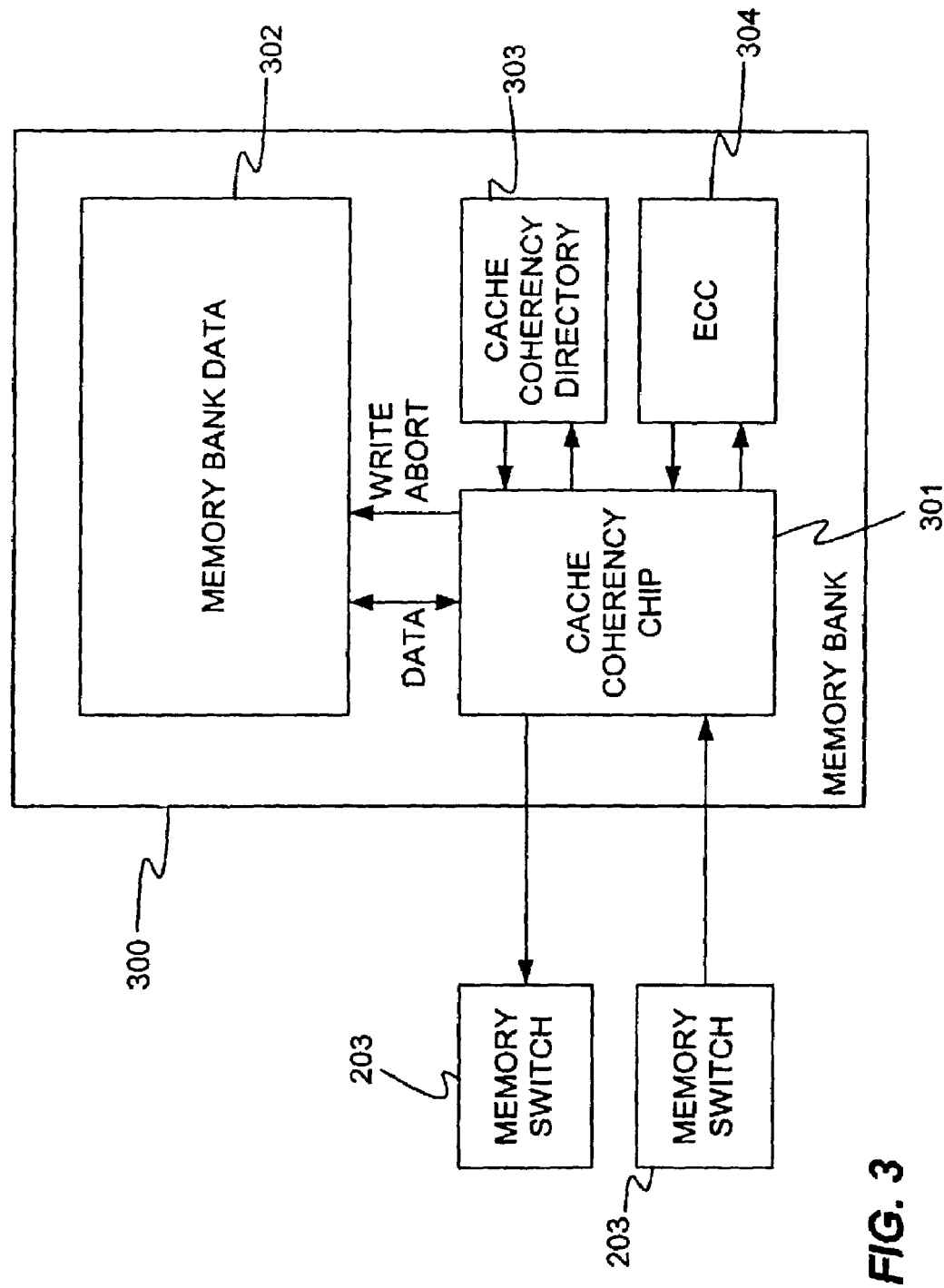
FIG. 3 shows example cache coherency mechanisms that may be associated with the memory banks of FIGS. 1-2.

FIG. 3 shows example cache coherency arrangements 300 which may be associated with, for example, a respective memory bank of FIGS. 1-2. More particularly, memory switches 203 may communicate with trunk lines 214 or fabric 220 (FIG. 2) to send and receive memory access requests. Upon receiving a memory access request, a memory switch 203 passes information including the target memory address and (home) node identification, as well as control mode information to cache coherency chip 301. The target memory address refers to a location in memory bank data portion 302. The node ID may be a value indicating a unique (source) processor board 101 in a multiprocessor system that is initiating or receiving a reply to the memory operation. In a particular embodiment this information is passed between switch 203 and cache coherency chip 301 as a data packet having defined fields for the various types of information.

Cache coherency chip 301 may be implemented as a custom integrated circuit such as an ASIC, a one time or reprogrammable logic device such as a programmable gate array, or as discrete components coupled in a conventional circuit board or multi-chip module. Cache coherency chip 301 may use the memory address to access cache coherency directory

303. Cache coherency directory 303 may include a multi-bit entry for each memory line (i.e., cache line) in the shared memory address space of the particular memory bank data portion 302. The entry may contain a value indicating the current state of the corresponding memory line.

In a particular example, the memory bank may be configured to support from 64 to 256 MBytes of memory; hence directory 303 may include on the order of 2 to 8 million entries for 256 bit wide memory lines (i.e., 32 bytes per cache line). In the particular example, each entry in directory 303 may be 36 bits wide. The entry may not have a fixed format in that the meaning given to any particular bit in an entry is dependent on the state of the entry as described in greater detail hereinafter.

More particularly, cache coherency directory 303 may also include a node presence vector that indicates which processor nodes 101 are currently represented in directory 303. In a particular example a 16-bit value may be used in a bit-map fashion to indicate which of 16 processor nodes 101 are represented. Each bit may represent a cluster or segment comprising multiple processors. The node presence vector can be queried rapidly to identify which nodes must be informed of a cache coherency operation, e.g., responsive to a snoop.

Memory bank 300 may also include error correcting mechanisms 304. Cache coherency chip 301 may receive/send mode bits as a part of the memory access packet from/to switch 203. These mode bits may indicate what type of data packet is being presented by the memory switch, or what type of packet is being presented to the memory switch 203. Error correcting mechanism 304 may use the mode information to identify and correct, if possible, errors before accessing coherency directory 303. Error correcting code may be used to correct data. Address errors are identified by parity bits and may not be correctable. These mechanisms may help to avoid memory errors caused by bit errors arising during communication between processor nodes 101 and memory bank 300.

The processor boards 101 (FIG. 1) may have cache coherency arrangements similar to those illustrated in the FIG. 3 memory bank example.

As mentioned previously, the present invention pertains to new streaming arrangements (e.g., apparatus and method) of transactions, and in one example, pertains to strongly ordered coherent writes implemented as snooped writes of strong order (SNPW_SO). Turning now to discussion of an example embodiment, for simplicity, a fewer number (e.g., three) of the FIG. 2 nodes may be highlighted in a more detailed example explanation regarding the same.

Figure 4:
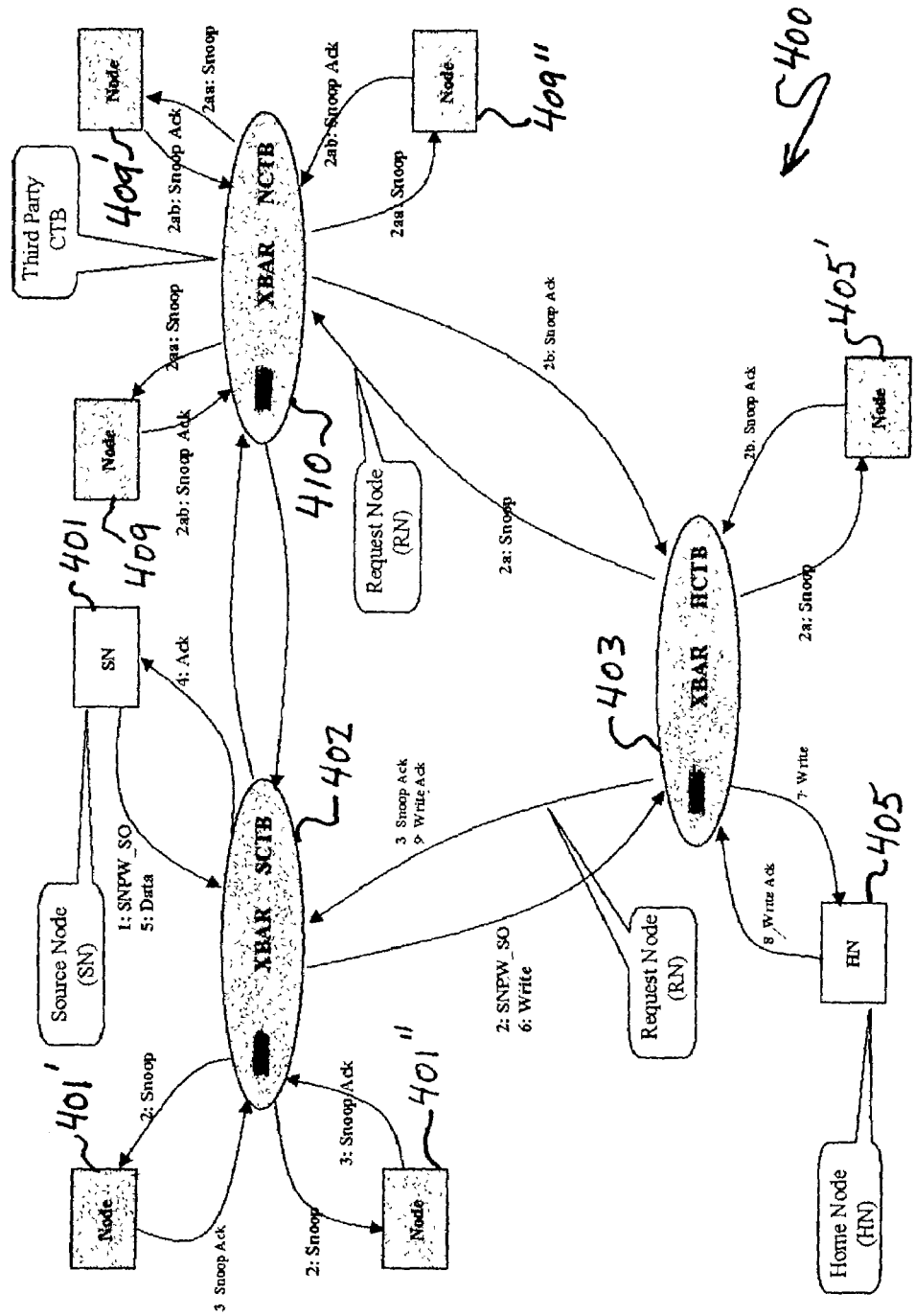
FIG. 4 shows an example transaction flow diagram with respect to an example transaction flow embodiment of the present invention; and, FIG. 5 shows an example state diagram with respect to an example embodiment of the present invention.

More particularly, FIG. 4 shows an example transaction flow diagram 400 with respect to an example transaction flow embodiment of the present invention, and for simplicity, pertains to a strongly ordered coherent write implemented as a snooped write of strong order (SNPW_SO). It should be understood that such SNPW_SO request may be part of a larger number of streamed strongly ordered transactions from the processor, and that separate transactions within the stream may be processed and progress substantially in parallel throughout the system, and may also be directed to differing home nodes (HN). However, for simplicity and brevity, FIGS. 4 and 5 discussions will be substantially limited to showing states with respect to only a single (subject) SNPW_SO (out of a possible string of streamed SNPW_So's).

Figure 5:
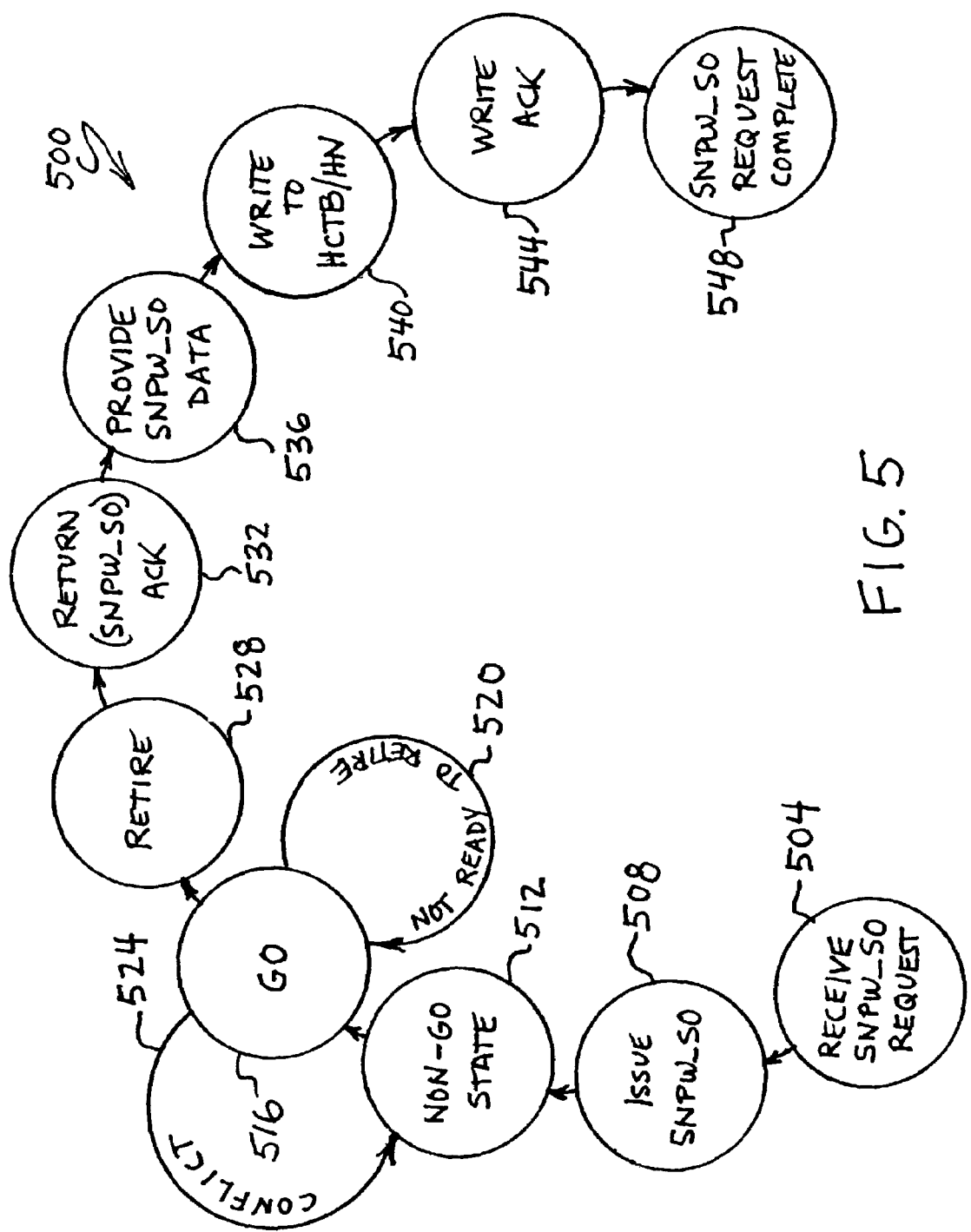

Before delving into the details of FIG. 4, attention is first directed to FIG. 5 in order to first gain a general overview of the single SNPW_SO example. More particularly, FIG. 5 shows an example state diagram 500 with respect to an example embodiment of the present invention. At some point in time, a node switch receives (504) the particular SNPW_SO request (e.g., from an on-board processor acting as a source node (SN)) and issues (508) such request onto the network.

A predetermined network entity (e.g., a source node's central tracking buffer (SCTB) is assigned, within the example embodiment of the present invention, the responsibility of tracking the stream of the strongly ordered transactions from the SN, and thus, begins to track progress of the subject strongly ordered write request. Initially, the request enters a non-global (non-GO) state 512, but eventually, the request enters a global (GO) state 516.

A write transaction is globally visible if every transaction from every node in its coherency domain can "see" its data. Unlike writeback data which are already globally visible (GO) and can be provided to any node which request the data, the SNPW_SO data can not, in the example embodiment of the present invention, be provided to any node until the SNPW_SO transaction is both GO and ready to retire.

If the request has reached a GO state 516, but is not yet ready to retire, the request is maintained 520 in the GO state 516. That is, when a SNPW_SO is GO but not ready to retire, it will be put on hold. In contrast, if there is a conflicting request with the SNPW_SO (i.e., pertaining to the same data) within the system, such conflicting transaction shall be allowed to proceed ahead of the SNPW_SO and invalidate the global visibility of the SNPW_SO, i.e., thus, the request is demoted 524 back to the non-GO state 512. The system fabric will return the pre-GO state to satisfy the conflicting transaction. To facilitate this process, it should be noted at this point that the data portion of the SNPW_SO is not transferred until the transaction is both GO and ready to retire. This way, the external system buffer (CTB) can return both the combined pre-GO snoop status and the modified data in any cache if any. When an invalidated SNPW_SO is ready to retire, it will re-start to achieve global visibility, i.e., will restart again to re-achieve the GO state 516 and continue on to further states of the FIG. 5 state diagram.

Continuing on, after the GO state 516, the request will eventually reach a condition where the request is ready to retire 528. That is, as mentioned previously, the present invention allows streaming of any number of strongly ordered transactions, e.g., strongly ordered coherent writes. Any particular SNPW_SO transaction is ready to retire if, in the present example of ordered SNPW_SO's, all the older SNPW_SOs in the same stream are GO.

In order to facilitate checking as to whether older SNPW_SOs in the same stream are GO, streamed SNPW_SO's may each be tagged with relative age information. As one example, a predetermined bit in the header may be used to indicate whether an SNPW_SO packet is the oldest or not, i.e., a first or leading streamed packet. An additional transaction ID (e.g., given, for example, an acronym "PreOldTrnID") in the packet header may be used to point to the transaction that is immediately older than the current transaction. Only the network entity (e.g., the SCTB, etc), tracking progression of the streamed requests may need to track the relative age of each strongly ordered transaction request, in order to track and police the stream of the strongly ordered transactions from the SN.

Continuing the FIG. 5 state diagram discussions, once the two (i.e., GO and ready to retire) conditions have been met with respect to a particular SNPW_SO request, a SNPW_SO acknowledgement is returned 532 to the original source node (SN). The SN then provides 536 the write data pertaining to the particular SNPW_SO request, which is then written 540 to the target home node (HN) via routing through a home CTB (HCTB). Upon return 544 of write acknowledgement, that particular SNPW_SO request is completed 548. The network entity (e.g., SCTB) assigned to track the streamed transaction requests may then repeat or continue processing with respect to any other SNPW_SO which might have also been streamed.

Discussion now returns to the FIG. 4 example transaction flow diagram 400. Remember that for simplicity and brevity, FIG. 4 will be limited to showing transaction flow with respect to only a single (subject) SNPW_SO (out of a possible string of streamed SNPW_So's). For further simplicity and brevity, FIG. 4 is limited to illustrating/discussing flow with respect to a source node (SN) cluster (configured onto crossbar (XBAR) 402), home node (HN) cluster (configured onto XBAR 403), and a single third party node cluster (configured onto XBAR 410).

As one example, FIG. 4's XBARs 402, 403, 410 may be analogous to FIG. 2's switches 202, 203, 210, respectively. Similarly: FIG. 4's nodes 401, 401', 401" may be analogous to ones of the processor boards 101 of the FIG. 2's processor group 201; FIG. 4's nodes 405, 405' may be analogous to ones of the memory boards 300 of the FIG. 2's memory bank 205; and, FIG. 4's nodes 409, 409', 409" may be analogous to ones of the processor boards 101 of the FIG. 2's processor group 209.

A glossary of relevant terms is as follows:

SN: source node. The source node initiates the streaming of the transactions, e.g., strongly order writes HN: home node. This is the destination of a transaction, e.g., a strongly ordered write.

!SN & !HN: Nodes that are neither home nor source, the so-called third party nodes RN: request node. The request node is the source node for a particular CTB. SN is a special case of RN.

CTB: central tracking buffer. This is a coherent switching device which contains multiple coherent buffers that tracks all the outstanding transactions that pass through the switch HCTB: the CTB that is connected to the HN !HCTB: the CTBs that are not connected to the HN SCTB: the CTB that is connected to the SN Beyond the above glossary, communications (e.g., snoops, acknowledgements, writes, etc) within the FIG. 4 flow diagram are illustrated representatively/simplistically as headed arrows. Such communications may be via any viable transmission method or link, and may be on the same channel, or on separate channels. More particularly, in a packet switch system, different types of packets may be transferred on different channels. Writebacks and special transactions may be issued on one channel that is guaranteed to be consumed with no conflict. Coherent reads and SNPW_SO may be issued on another. Acknowledgements may also have their own channel. Again, connections/channeling with respect to the communications are highly dependent upon the particulars of a platform upon which an embodiment of the present invention is implemented, and such should be well within a purview of those skilled in the art.

Beginning flow discussions, at any point in time, SN 401 (e.g., a FIG. 1 processor board 101) may output a SNPW_SO (shown by the FIG. 4 arrowed designation "1: SNPW_SO"). The SCTB of the XBAR 402 (e.g., FIG. 2's processor switch 202) receives such request, and broadcasts a snoop (shown by a number of arrowed designations "2: Snoop") onto various system nodes, i.e., in this example, broadcasts snoops to the nodes 401', 401" (e.g., other FIG. 1 processor boards 101 of the FIG. 2 processor group 201), and also sends the SNPW_SO (shown by the arrowed designation "2: SNPW_SO") to the XBAR 403 (e.g., FIG. 2's memory switch 203).

Responsive to the forwarded SNPW_SO, the XBAR 403, in turn, broadcasts snoops (shown by a number of arrowed designations "2a: Snoop") onto various additional system nodes, i.e., in this example, broadcasts snoops to the node 405' (e.g., other FIG. 3 memory boards 300 of the FIG. 2 memory group 205) and also to the XBAR 410 (e.g., FIG. 2's processor switch 210). Responsive to the forwarded Snoop, the XBAR 410, in turn, broadcasts snoops (shown by a number of arrowed designations "2aa: Snoop") onto various additional system nodes, i.e., in this example, broadcasts snoops to the nodes 409, 409', 409" (e.g., other FIG. 1 processor boards 101 of the FIG. 2 processor group 209).

At some point in time, all of the snooped nodes attached to the XBAR 410 will have returned snoop acknowledges (shown by a number of arrowed designations "2ab: Snoop Ack") back to the XBAR 410. The XBAR 410 returns a snoop acknowledge (shown by an arrowed designation "2b: Snoop Ack") back to the node which had originally provoked the snoop, i.e., in this example, the XBAR 403. At some point in time, the XBAR 403 will have received snoop acknowledges (shown by a number of arrowed designations "2b: Snoop Ack") back from all of the snooped nodes attached to the XBAR 403. The XBAR 403 returns a snoop acknowledge (shown by an arrowed designation "3: Snoop Ack") back to the node that had originally provoked the snoop, i.e., in this example, the XBAR 402.

At some point in time, the XBAR 402 will have received snoop acknowledges (shown by a number of arrowed designations "3: Snoop Ack") back from all of the snooped nodes attached to the XBAR 402. The XBAR 402 returns an acknowledge (shown by an arrowed designation "4: Ack") back to the node which had originally provoked the SNPW_SO request, i.e., in this example, the SN 401.

Responsive to the acknowledge, the SN 401 outputs the data (shown by the arrowed designation "5: Data") associated with the SNPW_SO. The XBAR 402 (e.g., SCTB) receives such data (in this example, write data), and forwards a write (shown by arrowed designation "6: Write") to the home XBAR (in this example, the XBAR 403). Responsive to receipt thereof, the XBAR 403 (e.g., HCTB) outputs the write (shown by arrowed designation "7: Write") to the HN 405 associated with the SNPW_SO. The HN 405 performs the write, and returns a write acknowledge (shown by arrowed designation "8: Write Ack.") back to the XBAR 403 (HCTB).

The XBAR 403 (e.g., HCTB) performs any internal updating and forwards the write acknowledge (shown by arrowed designation "9: Write Ack.") back to the XBAR 402 (SCTB). Upon the XBAR 402's receipt of such write acknowledge and upon internal updating regarding tracking/completion, the subject SNPW_SO has been completed.

At this point, it is useful to note that embodiments of the present invention allows each write of a streamed write to go via differing routes and/or to differing HNs. That is, some system protocols allow strongly ordered writes only if the destination and the routing paths of the writes are exactly the same. With embodiments of the present invention, writes to different HNs are fully supported. In other words, a node can stream strongly ordered writes even if the destinations or routing paths of the ordered writes are different. One reason for this is that, with the embodiments of the present invention, a predetermined network entity (e.g., the SCTB as a source switching node) is assigned the responsibility of tracking progress of the streamed, strongly ordered transactions from ones of SNs attached thereto.

To aid in improved understanding of the FIGS. 4-5 embodiment, the following table has been compiled, such table individually listing example transaction flow operations for ones of the various main node entities illustrated and discussed:

| | |
|---|---|
| SN | 1. Receive SNPW_SO request |
| | 2. Issue SNPW_SO |
| | 3. Receive acknowledgement for SNPW_SO |
| | 4. Issue the SNPW_SO's data. Note data is provided as a last step. |
| HN | 1. Receive writes from HCTB |
| | 2. Return acknowledgement |
| !SN & !HN | 1. Receive Snoop and invalidate request from its CTB |
| | 2. Return snoop results. If the line is modified, return both the modified data and the snoop result. |
| SCTB | 1. Broadcast SNPW_SO to all nodes except SN and !HCTB |
| |   a. SNPW_SO to HCTB |
| |   b. Snoop and invalidate to others |
| | 2. No data is returned to SN. Modified data (if any) is kept in the CTB |
| | 3. Collect all snoop responses |
| | 4. After the transaction is GO, return acknowledgement to SN when one of the following conditions becomes true |
| |   a. the transaction is orderless (weakly-ordered) |
| |   b. all the older transactions are globally visible |
| | 5. Receive data for the SNPW_SO from SN |
| | 6. Send a write to HCTB if HCTB is remote or HN if HCTB = SCTB |
| |   a. If there is any modified data resulted from the snoop, combine the modified data and SNPW_SO data into one write |
| | 7. Receive acknowledgement for the write from HCTB or HN |
| | 8. if a conflict is detected before GO, normal conflict resolution will be employed (which is not covered by this patent) |
| | 9. If a conflict is detected after GO but before ready-to-retire, SCTB will return the combined snoop status and modified data from snoop (if any). SNPW_SO is demoted to non-GO |
| | 10. If a conflict is detected after both GO and ready-to-retire, hold the conflicting transaction until the write acknowledgement is received from HCTB (step 7) and then return clean snoop response to HCTB. Note that both the write and its acknowledgement are guaranteed to be consumed with no conflict |
| HCTB | 1. Broadcast the request to all nodes (including all !HCTBs) except RN |
| |   a. Snoop and invalidate request to all nodes except RN |
| | 2. Once all the snoop responses are collected, return the combined snoop responses to the RN |
| | 3. No data is returned to SCTB. M data (if any) will be kept in HCTB |
| | 4. Receive a write from SCTB |
| | 5. Send the write to HN |
| | 6. Receive acknowledgement for the write from HN |
| | 7. Send acknowledgement for the write to SCTB |
| | 11. if a conflict is detected before GO, normal conflict resolution will be employed (which is not covered by this patent) |
| | 8. If a conflict is detected after GO, HCTB will do the following: |
| |   a. Send a snoop request only to SCTB. There is no need to broadcast to any other nodes or third party CTBs |
| |   b. If conflict write is received from SCTB before the snoop response, return acknowledgement for the write and then retire SNPW_SO and then return the snoop dirty and the write data to the conflicting new request |
| |   c. If no conflict write is received from SCTB before the snoop response, return the combined snoop status and modified data from snoop (if any). SNPW_SO is demoted to non-GO |

-continued

| | |
|---|---|
| Other CTBs | 1. Broadcast the request to all nodes |
| | 2. Once all the snoop responses are collected, return the combined snoop responses (including modified data if any) to the RN |

In closing, the present invention deals with how to stream strongly ordered transactions (e.g., writes) at maximum speed without heavy cost penalty in a system with multiple routes, switching elements or multiple forks. Thus, the present invention provides, for example, a way to stream strongly ordered writes in a packet switch system with multiple switch elements. The switch elements may or may not be coherent. While embodiments of the invention have been described in connection with the design of a packet-based protocol, it may also be able to be applied to a shared bus that supports out-of-order transaction completion.

At least a portion (if not all) of the present invention may be practiced as a software invention, implemented in the form of a machine-readable medium having stored thereon at least one sequence of instructions that, when executed, causes a machine to effect operations with respect to the invention. With respect to the term "machine", such term should be construed broadly as encompassing all types of machines, e.g., a non-exhaustive listing including: switches, bus masters, computing machines, non-computing machines, communication machines, etc. A "machine-readable medium" includes any mechanism that provides (i.e., stores and/or transmits) information in a form readable by a machine (e.g., a processor, computer, electronic device). Such "machine-readable medium" term should be broadly interpreted as encompassing a broad spectrum of mediums, e.g., a non-exhaustive listing including: electronic medium (read-only memories (ROM), random access memories (RAM), flash cards); magnetic medium (floppy disks, hard disks, magnetic tape, etc.); optical medium (CD-ROMs, DVD-ROMs, etc); etc.

Method embodiments may be emulated as apparatus embodiments (e.g., hardwired or constructed in a manner so as to effect the method operations); apparatus embodiments may be emulated as method embodiments. Still further, embodiments within a scope of the present invention and attached claims include simplistic level embodiments through system levels embodiments. For example, a source switching node (e.g., implemented as a chip, chipset, board, etc) may itself implement example embodiments, or it may be a number of system entities which implement the embodiments.

In concluding, reference in the specification to "one embodiment", "an embodiment", "example embodiment", etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Furthermore, for ease of understanding, certain method procedures may have been delineated as separate procedures; however, these separately delineated procedures should not be construed as necessarily order dependent in their performance, i.e., some procedures may be able to be performed in an alternative ordering, simultaneously, etc.

This concludes the description of the example embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

The invention claimed is:

1. A method of effecting ordered transactions in a local machine having a plurality of switching elements to route transactions, the method comprising:

for each ordered transaction stream, assigning, out of the plurality of switching elements, a source switching element with the responsibility of tracking progression and ordered completion of transactions within an ordered transaction stream; the source switching element including operations of:

receiving ordered transactions of the ordered transaction stream from a source node, and enabling tracking of progression of the ordered transactions;

for each ordered transaction of the ordered transaction stream, returning, upon a ready to retire state of the ordered transaction and also completion of all older transactions, a ready for data acknowledgement back to the source node which originated the ordered transaction; and responsive to the ready for data acknowledgement, receiving source node data for the ordered transaction and forwarding the same to a target node, and verifying completion of the ordered transaction.

2. A method as claimed in claim 1, further comprising:

allowing each ordered transaction of the ordered transaction stream to achieve global visibility within the local machine; and upon occurrence of a conflicting transaction which conflicts with any respective ordered transaction which has not yet achieved the ready to retire state, invalidating the global visibility of the respective ordered transaction, and permitting processing of the conflicting transaction.

3. A method as claimed in claim 2, further comprising:

for the permitting processing of the conflicting transaction, returning at least one of a snooped status and snooped data to a conflicting node which had requested the conflicting transaction, the snooped data being modified data which was in existence in cache at a time the respective ordered transaction had achieved global visibility.

4. A method as claimed in claim 2, further comprising:

assigning, out of the plurality of switching elements, at least one home switching element which is a target switch for the target node of at least one transaction of the ordered transaction stream; and, assigning the responsibility of the invalidating and the permitting processing operations to at least one of the source switching element and the at least one home switching element.

5. A method as claimed in claim 1, where the method is implemented in one of a packet switching system, a fabric switching system and crossbar bus system.

6. A method as claimed in claim 1, where the source switching element autonomously has the responsibility of tracking progression and ordered completion of the transactions within the ordered transaction stream.

7. A method as claimed in claim 1, where the source switching element is a source central tracking buffer element (SCTB) having the responsibility of handling transactions from the source node.

8. A method as claimed in claim 1, where the ordered transaction stream includes snooped writes that are strongly ordered.

9. A machine-readable storage medium having stored thereon at least one sequence of instructions that, when executed, causes a machine to effect:

a method of ordering transactions in a local machine having a plurality of switching elements operative to route transactions within the local machine, the method comprising:

for each ordered transaction stream, assigning, out of the plurality of switching elements, a source switching element with the responsibility of tracking progression and ordered completion of transactions within an ordered transaction stream; the source switching element effecting operations including:

receiving ordered transactions of the ordered transaction stream from a source node, and enabling tracking of progression of the ordered transactions;

for each ordered transaction of the ordered transaction stream, returning, upon a ready to retire state of the ordered transaction and also completion of all older transactions, a ready for data acknowledgement back to the source node which originated the ordered transaction; and responsive to the ready for data acknowledgement, receiving source node data for the ordered transaction and forwarding the same to a target node, and verifying completion of the ordered transaction.

10. A medium as claimed in claim 9, the method further comprising:

allowing each ordered transaction of the ordered transaction stream to achieve global visibility within the local machine; and upon occurrence of a conflicting transaction which conflicts with any respective ordered transaction which has not yet achieved the ready to retire state, invalidating the global visibility of the respective ordered transaction, and permitting processing of the conflicting transaction.

11. A medium as claimed in claim 10, the method further comprising:

for the permitting processing of the conflicting transaction, returning at least one of a snooped status and snooped data to a conflicting node which had requested the conflicting transaction, the snooped data being modified data which was in existence in cache at a time the respective ordered transaction had achieved global visibility.

12. A medium as claimed in claim 10, the method further comprising:

assigning, out of the plurality of switching elements, at least one home switching element which is a target switch for the target node of at least one transaction of the ordered transaction stream; and, assigning the responsibility of the invalidating and the permitting processing operations to at least one of the source switching element and the at least one home switching element.

13. A medium as claimed in claim 9, where the method is implementable in one of a packet switching system, a fabric switching system and crossbar bus system.

14. A medium as claimed in claim 9, where the source switching element autonomously has the responsibility of tracking progression and ordered completion of the transactions within the ordered transaction stream.

15. A medium as claimed in claim 9, where the source switching element is a source central tracking buffer element (SCTB) having the responsibility of handling transactions from the source node.

16. A medium as claimed in claim 9, where the ordered transaction stream includes snooped writes that are strongly ordered.

17. A switching system to effect ordered transactions in a local machine having a plurality of switching elements operative to route transactions within the local machine, the switching system comprising:
   a source switching element having, for an ordered transaction stream delivered to the source switching element, a responsibility of tracking progression and ordered completion of transactions within the ordered transaction stream; the source switching element operable to:
   receive ordered transactions of the ordered transaction stream from a source node, and track progression of the ordered transactions;
   return, for each ordered transaction of the ordered transaction stream, upon a ready to retire state of the ordered transaction and also completion of all older transactions, a ready for data acknowledgement back to the source node which originated the ordered transaction; and
   receive, responsive to the ready for data acknowledgement, source node data for the ordered transaction and forward the same to a target node, and verify completion of the ordered transaction.

18. A switching system as claimed in claim 17, further comprising the source switching element operable to:
   allow each ordered transaction of the ordered transaction stream to achieve global visibility within the local machine; and
   upon occurrence of a conflicting transaction which conflicts with any respective ordered transaction which has not yet achieved the ready to retire state, invalidate the global visibility of the respective ordered transaction, and permit processing of the conflicting transaction.

19. A switching system as claimed in claim 18, further comprising the source switching element operable to:
   return at least one of a snooped status and snooped data to a conflicting node which had requested the conflicting transaction, the snooped data being modified data in existence in cache at a time the respective ordered transaction had achieved global visibility.

20. A switching system as claimed in claim 18, further comprising:
   at least one home switching element which is a target switch for the target node of at least one transaction of the ordered transaction stream; the at least one home switching element having an ability to invalidate the global visibility of the respective ordered transaction, and permit processing of the conflicting transaction.

21. A switching system as claimed in claim 17, where the switching system is one of a packet switching system, a fabric switching system and crossbar bus system.

22. A switching system as claimed in claim 17, where the source switching element autonomously has the responsibility of tracking progression and ordered completion of the transactions within the ordered transaction stream.

23. A switching system as claimed in claim 17, where the source switching element is a source central tracking buffer element (SCTB) having the responsibility of handling transactions from the source node.

24. A switching system as claimed in claim 17, where the ordered transaction stream includes snooped writes that are strongly ordered.

25. A local machine comprising:
   a source node;
   at least one target node;
   a switching system having a plurality of switching elements operative to route transactions within the local machine, and a source switching element having, for an ordered transaction stream delivered to the source switching element, a responsibility of tracking progression and ordered completion of transactions within the ordered transaction stream; the source switching element operable to:
   receive ordered transactions of the ordered transaction stream from the source node, and track progression of the ordered transactions;
   return, for each ordered transaction of the ordered transaction stream, upon a ready to retire state of the ordered transaction and also completion of all older transactions, a ready for data acknowledgement back to the source node which originated the ordered transaction; and
   receive, responsive to the ready for data acknowledgement, source node data for the ordered transaction and forward the same to a target node of the at least one target node, and verify completion of the ordered transaction.

26. A local machine as claimed in claim 25, further comprising the source switching element operable to:
   allow each ordered transaction of the ordered transaction stream to achieve global visibility within the local machine; and
   upon occurrence of a conflicting transaction which conflicts with any respective ordered transaction which has not yet achieved the ready to retire state, invalidate the global visibility of the respective ordered transaction, and permit processing of the conflicting transaction.

27. A local machine as claimed in claim 26, further comprising the source switching element operable to:
   return at least one of a snooped status and snooped data to a conflicting node which had requested the conflicting transaction, the snooped data being modified data in existence in cache at a time the respective ordered transaction had achieved global visibility.

28. A local machine as claimed in claim 26, further comprising:
   at least one home switching element which is a target switch for the target node of at least one transaction of the ordered transaction stream; the at least one home switching element having an ability to invalidate the global visibility of the respective ordered transaction, and permit processing of the conflicting transaction.

29. A local machine as claimed in claim 25, where the switching system is one of a packet switching system, a fabric switching system and crossbar bus system.

30. A local machine as claimed in claim 25, where the source switching element autonomously has the responsibility of tracking progression and ordered completion of the transactions within the ordered transaction stream.

31. A local machine as claimed in claim 25, where the source switching element is a source central tracking buffer element (SCTB) having the responsibility of handling transactions from the source node.

32. A local machine as claimed in claim 25, where the ordered transaction stream includes snooped writes that are strongly ordered.

33. A local machine as claimed in claim 25, where the local machine is one of a personal computer, a server, a mainframe computer and an electronic apparatus.

* * * * *